Dec. 27, 1955     K. F. SCHLEGEL, JR     2,728,108
METHOD OF MAKING VENETIAN BLIND LADDER TAPE
Filed Sept. 21, 1950
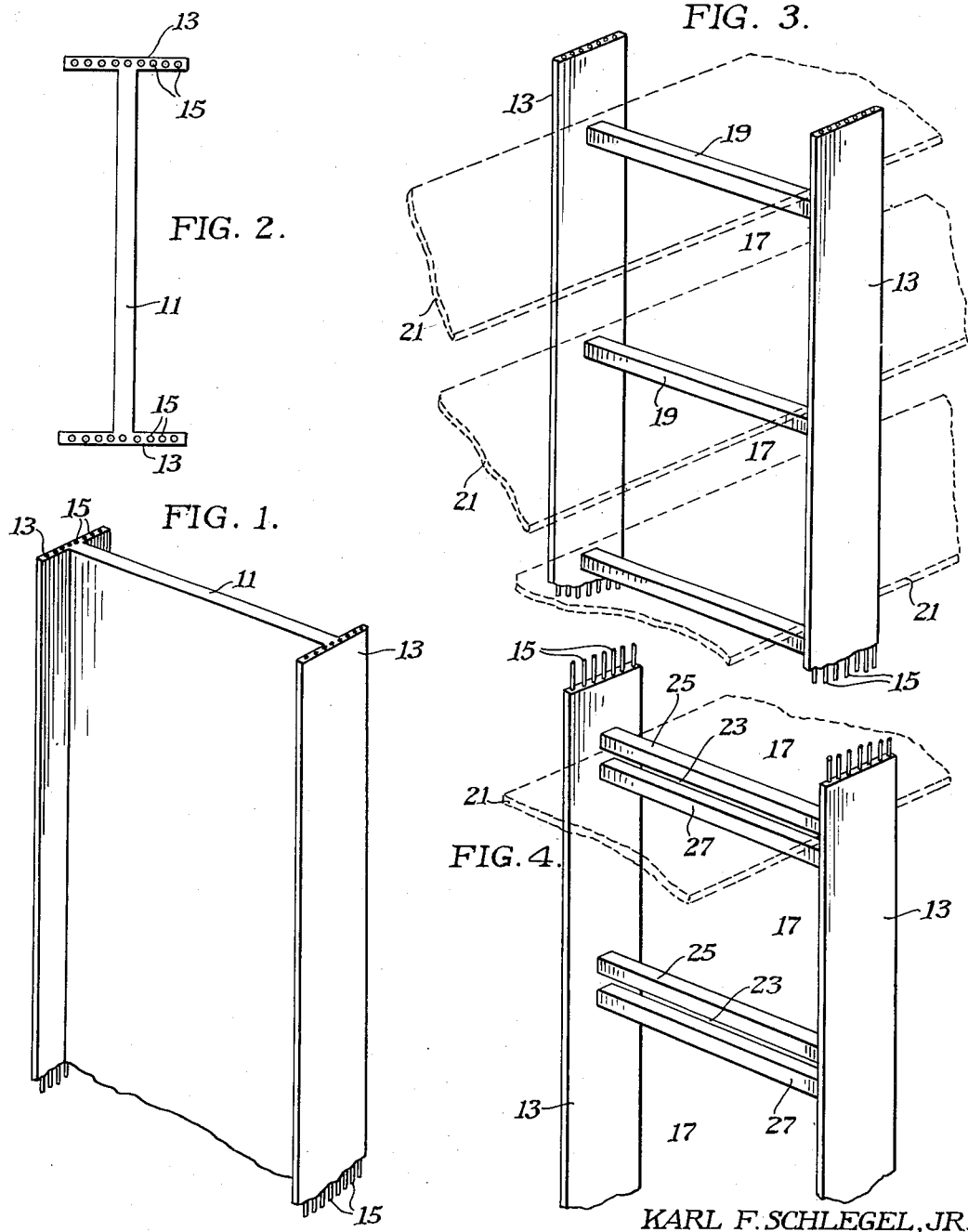
KARL F. SCHLEGEL, JR.
INVENTOR
BY Charles Shepard
ATTORNEY

United States Patent Office 2,728,108
Patented Dec. 27, 1955

2,728,108

METHOD OF MAKING VENETIAN BLIND LADDER TAPE

Karl Frederick Schlegel, Jr., Penfield, N. Y.

Application September 21, 1950, Serial No. 186,035

4 Claims. (Cl. 18—47.5)

This invention relates to the supporting members for supporting the slots of Venetian blinds, such members commonly being known as Venetian blind ladder tape. It deals both with such ladder tape as an article, and with the method of manufacturing the same.

An object of the invention is the provision of improved and more satisfactory ladder tape, and an improved and more satisfactory method of making the same.

Another object of the invention is the provision of a ladder tape which is extremely economical and quick to manufacture, pleasing in appearance, and sturdy and durable in use.

Still another object is the provision of simple and inexpensive means for manufacturing such ladder tape on a mass production basis.

A further object of the invention is the provision of a ladder tape, and of a method of manufacturing such ladder tape, which requires no weaving machinery of any kind.

These and other desirable objects may be attained in the manner disclosed as an illustrative embodiment of the invention in the following description and in the accompanying drawings forming a part hereof, in which:

Fig. 1 is a perspective view of a fragment of a ladder tape in accordance with the present invention, in a preliminary stage of its manufacture;

Fig. 2 is a cross section taken transversely therethrough;

Fig. 3 is a perspective view of the ladder tape in its finished form, with the Venetian blind slats shown in broken lines; and Fig. 4 is a view similar to Fig. 3, showing a modified construction.

The same reference numerals throughout the several views indicate the same parts.

According to the present invention, the ladder tape is formed by extruding, from the usual plastic extrusion press, a long band or ribbon of plastic material of a shape having a web 11 and thickened or enlarged reinforcing portions at opposite side edges of this web. The reinforcing portions may conveniently be in the form of lateral flanges, arranged approximately at right angles to the general plane of the web 11, so that the complete extruded band has the general shape of a structural I-beam.

Many plastic materials suitable for extrusion are well known in the plastics industry, and need not be described in detail here. Among the plastics suitable for this purpose may be mentioned the general class of vinyl plastics, the polyethylene plastics, and the tetrafluorethylene plastics. The plastics in these categories will ordinarily retain, after extrusion, sufficient pliability or flexibility for use as a Venetian blind ladder tape, while at the same time being free of that excessive elasticity or stretchability which will result in any pronounced permanent sagging or elongation under continued use. However, if it is desired to insure against any substantial elongation of the strip where it is used in special locations such as over a hot radiator or by a window where subjected to hot sun, then reinforcing cords or strands of fine metal wires, or rayon, or spun glass fibers, or other suitable fibers having a relatively low reciprocal of modulus of elasticity under longitudinal tension, may be incorporated in the flanges 13 or other thickened or enlarged portions at the edges of the web 11, as indicated at 15, these reinforcing strands preferably being incorporated in the extrusion machine and embedded in the plastic material as it is extruded from the extrusion nozzle, in a manner well understood in the extrusion art.

The extruded strip above described, one form of which is fragmentarily shown in Fig. 1, is then passed through a punch press or other suitable punching mechanism, and relatively large areas 17 of the web 11 are punched out, leaving a series of spaced cross bars 19 between the areas 17 which were punched out. These cross bars 19, being part of the original material forming the web 11, are spaced from each other at the proper distance to support the Venetian blind slats 21 at the desired spacing from each other. The punched-out areas 17 do not cut into or weaken the enlarged edge portions 13, which now become the main longitudinal structural members of the tape.

The ladder tape material, after the holes are punched in the web, is then cut into the desired lengths, and a pair of lengths are fastened at their upper ends to the usual top rail or head frame of the Venetian blind mechanism, and fastened at their lower ends to the usual bottom rail of the Venetian blinds, and the slats 21 are inserted in the spaces 17 so as to be supported by the cross pieces 19.

This manufacturing process is exceedingly simple and economical, because it may be performed very rapidly, and because there is no waste material. The pieces of the web which are punched out at 17 are simply fed back into the hopper of the extrusion machine, to be remelted or replasticized therein and to add to the body of plastic material being extruded from the machine. Thus there is substantially no waste or scrap.

As well understood in the plastics extrusion art, the extruded section or strip may be left clear and transparent, or may be, at very slight expense, tinted or colored in any desired manner. Hence it is possible, at low cost, to produce ladder tapes to match with or to contrast in any desired manner with the color of the blind slats themselves, or the color scheme of the room in which the Venetian blinds are to be used.

In the modified construction shown in Fig. 4, the method of manufacture is the same up to the point of punching the holes or areas in the web 11. In this modification, instead of punching successive large areas 17 and leaving single strips 19 between them, the punching of a large area 17 is followed by the punching of a relatively narrow area 23, then another large area 17 is punched, then another narrow area 23, and so on, in succession. Thus the cross pieces, instead of being single cross pieces as at 19, are arranged in pairs 25 and 27, relatively close to each other. The blind slats 21 are inserted through the narrow punched openings 23, so as to lie on and be supported by the cross pieces 27, while the companion cross pieces 25 lie just above and fairly tight against the top surfaces of the respective blind slats and prevents them from staying in a tilted or cocked position when they are not supposed to be tilted.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. The method of making a Venetian blind ladder tape which includes the steps of: forming an integral plastic band with an unbroken integral web in its central portion and longitudinally extending strengthening flanges at the lateral edges of said web, and subsequently punching out and removing portions of said web throughout the whole width of the web at successive intervals while leaving intact the internal flanges and also leaving, between the cut-away portions, relatively narrow intact portions of the web to form cross bars for cooperation with slats of Venetian blinds, said cross bars being connected to each other by the intact lateral flanges.

2. The method as defined in claim 1, further including the steps of forming said plastic band by extrusion of plastic material through an extrusion nozzle shaped to the cross section of the band, and extruding with the plastic band a plurality of relatively non-stretchable reinforcing strands in position to extend longitudinally along and be encompassed by and imbedded in said strengthening portions of said band.

3. The method as defined in claim 1, in which said strengthening flanges extend approximately at right angles to said web.

4. The method of making a Venetian blind ladder tape of plastic material which comprises the steps of extruding through an extrusion nozzle a plastic structure having the cross sectional shape approximately of an I-beam with two side flanges of sufficient cross sectional shape and strength to support Venetian blind slats hung from the tape and with an initially solid transverse flange extending between the two side flanges and formed integrally therewith and serving to connect the two side flanges, and subsequently removing major portions of said transverse flange to provide openings through which Venetian blind slats may extend, while leaving minor portions of said transverse flange intact to provide integral connecting strips extending between the two side flanges and normally arranged approximately at right angles to both of them, to provide supports for the Venetian blind slats extending through said openings.

UNITED STATES PATENTS

References Cited in the file of this patent

| | | |
|---|---|---|
| 815,571 | Williams | Mar. 20, 1906 |
| 1,539,052 | McCrohan | May 26, 1925 |
| 2,063,019 | Bardach et al. | Dec. 8, 1936 |
| 2,123,817 | Warren | July 12, 1938 |
| 2,139,788 | Woolson | Dec. 13, 1938 |
| 2,153,414 | Dodge | Apr. 4, 1939 |
| 2,405,579 | Hunter | Aug. 13, 1946 |
| 2,437,884 | Maynard | Mar. 16, 1948 |